United States Patent
Xu et al.

(10) Patent No.: US 12,001,907 B2
(45) Date of Patent: Jun. 4, 2024

(54) METHOD AND SYSTEM FOR ACQUIRING INFORMATION ABOUT AN ACCESSORY OF A VEHICLE

(71) Applicant: Volvo Truck Corporation, Gothenburg (SE)

(72) Inventors: Wen Xu, Gothenburg (SE); Tommy Rosgardt, Lindome (SE); Anders Björklund, Gothenburg (SE); Ingmar Bengtsson, Lindome (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 16/494,038

(22) PCT Filed: Mar. 16, 2017

(86) PCT No.: PCT/EP2017/056256
§ 371 (c)(1),
(2) Date: Sep. 13, 2019

(87) PCT Pub. No.: WO2018/166602
PCT Pub. Date: Sep. 20, 2018

(65) Prior Publication Data
US 2020/0012828 A1    Jan. 9, 2020

(51) Int. Cl.
*G06K 7/10* (2006.01)
*B60R 16/023* (2006.01)
*G06K 7/14* (2006.01)

(52) U.S. Cl.
CPC ...... *G06K 7/10366* (2013.01); *B60R 16/0231* (2013.01); *G06K 7/1413* (2013.01); *G06K 7/1417* (2013.01)

(58) Field of Classification Search
CPC ............ G06K 7/10366; G06K 7/1413; G06K 7/1417; B60R 16/0231
(Continued)

(56) References Cited

U.S. PATENT DOCUMENTS

| 5,142,278 | A   |   | 8/1992  | Moallemi et al. |          |
|-----------|-----|---|---------|-----------------|----------|
| 8,862,313 | B2  | * | 10/2014 | Brey ........................ | G07C 5/08 |
|           |     |   |         |                 | 701/29.3 |

(Continued)

FOREIGN PATENT DOCUMENTS

| CA | 2910842    | A1 | * | 1/2009 | ............ G06F 17/00 |
| CN | 101758752  | A  |   | 6/2010 |                         |

(Continued)

OTHER PUBLICATIONS

International Search Report and Written Opinion for International Patent Application No. PCT/EP2017/056256, dated Nov. 29, 2017, 9 pages.

(Continued)

*Primary Examiner* — Michael G Lee
*Assistant Examiner* — David Tardif
(74) *Attorney, Agent, or Firm* — Withrow & Terranova, PLLC

(57) ABSTRACT

The invention relates to a method of acquiring information of an accessory connected to a vehicle. The method comprises, in a control unit of the vehicle, acquiring an accessory identifier from the accessory. The method further comprises transmitting the accessory identifier to a remote server comprising accessory information, matching, in the server, the accessory identifier with corresponding accessory information, transmitting the accessory information to the vehicle and receiving the accessory information in the control unit.

20 Claims, 4 Drawing Sheets

(58) Field of Classification Search
USPC .......................................................... 235/451
See application file for complete search history.

(56) References Cited

U.S. PATENT DOCUMENTS

| | | | | |
|---|---|---|---|---|
| 9,127,945 | B2* | 9/2015 | Telang | G06Q 10/08 |
| 9,716,968 | B2* | 7/2017 | Mansuri | H04W 4/80 |
| 9,755,851 | B2* | 9/2017 | Grimm | H04W 12/106 |
| 9,779,379 | B2* | 10/2017 | Hall | G01S 19/16 |
| 10,403,103 | B1* | 9/2019 | Kugler | G08B 29/046 |
| 10,654,447 | B2* | 5/2020 | Oesterling | G06F 21/34 |
| 2003/0233189 | A1* | 12/2003 | Hsiao | G01C 21/26 |
| | | | | 340/988 |
| 2010/0156667 | A1 | 6/2010 | Bennie et al. | |
| 2010/0223090 | A1 | 9/2010 | Lozito | |
| 2011/0303741 | A1 | 12/2011 | Bolton et al. | |
| 2014/0005887 | A1 | 1/2014 | Tippelhofer | |
| 2015/0095255 | A1* | 4/2015 | Hall | G01S 19/16 |
| | | | | 705/333 |
| 2016/0240018 | A1 | 8/2016 | Shayovitch | |
| 2016/0280267 | A1* | 9/2016 | Lavoie | B62D 5/0409 |
| 2018/0039917 | A1* | 2/2018 | Buttolo | G06Q 10/109 |
| 2019/0299930 | A1* | 10/2019 | Golsch | H04W 12/04 |
| 2020/0198559 | A1* | 6/2020 | Krosschell | B60K 35/00 |

FOREIGN PATENT DOCUMENTS

| | | |
|---|---|---|
| CN | 102870064 A | 1/2013 |
| EP | 1667059 A1 | 6/2006 |
| WO | 2013046237 A1 | 4/2013 |

OTHER PUBLICATIONS

International Preliminary Report on Patentability for International Patent Application No. PCT/EP2017/056256, dated Feb. 12, 2019, 3 pages.
First Office Action for Chinese Patent Application No. 201780085225.3, dated May 5, 2022, 20 pages.

* cited by examiner

METHOD AND SYSTEM FOR ACQUIRING INFORMATION ABOUT AN ACCESSORY OF A VEHICLE

This application is a 35 USC 371 national phase filing of international application no. PCT/EP2017/056256, filed Mar. 16, 2017, the disclosure of which is incorporated herein by reference in its entirety.

TECHNICAL FIELD

The invention relates to a method and a system for acquiring information about an accessory of a vehicle.

The invention can be applied in vehicles and heavy-duty vehicles, such as trucks, buses and construction equipment. Although the invention will be described with respect to a truck, the invention is not restricted to this particular vehicle, but may also be used in other types of vehicles, heavy-duty vehicles and working machines which are configured to be used with different types of accessories or implements.

BACKGROUND

A truck or a heavy vehicle is many times configured in a modular manner such that it may be used together with a range of different accessories. Moreover, with the increasing implementation of vehicle telematics, there needs to be a communication channel between the vehicle and the accessory. In a scenario where a truck is coupled with a bodywork, an equipment, a trailer or another accessory, a bi-directional communication channel between the truck and the bodywork, equipment or trailer is often established.

In order to know the status of the bodywork, equipment or trailer or to control functionality of the accessory, a connected vehicle needs to know the properties and the capabilities of the bodywork, equipment or trailer, i.e., what kind of bodywork, equipment or trailer it is, what it is capable of doing, what kinds of control commands it can accept and what information/data it can supply. This is normally done by configuring a specific vehicle-accessory combination in a workshop. For example, a known solution is to hardcode the configuration of the bodywork from a specific vendor so that the truck is able to communicate with the bodywork. Whenever a new type of bodywork or a bodywork from a new vendor needs to be connected to the truck, manual configuration of the truck is needed.

In view of the above, it is desirable to simplify the connection of a new accessory to a vehicle such that a previously unknown accessory can be used with a vehicle without requiring configuration in a workshop.

As an example, U.S. Pat. No. 5,142,278 discloses an apparatus and a method for providing communication of information between a truck tractor and trailer via existing truck wiring. By means of the established communications interface, information of the trailer can be transmitted to the vehicle.

However, it is still desirable to provide an improved method of connecting an accessory to a vehicle.

SUMMARY

An object of the invention is to provide an improved method and system of acquiring information of an accessory connected to a vehicle.

According to a first aspect of the invention, the object is achieved by a method of acquiring information according to claim 1.

Accordingly, there is provided a method of acquiring information of an accessory connected to a vehicle. The method comprises, in a control unit of the vehicle, acquiring an accessory identifier from the accessory. The method further comprises transmitting the accessory identifier to a remote server comprising accessory information, matching, in the remote server, the accessory identifier with corresponding accessory information, transmitting the accessory information to the vehicle and receiving the accessory information in the control unit.

Hereby, a method is provided which simplifies the communication between the vehicle and the accessory since no manual configuration is needed. Moreover, an advantage of the method is that the vehicle always has access to updated accessory information from the server. Accordingly, information describing properties of an accessory need not be stored in the accessory itself, in the vehicle or be manually provided to the vehicle or accessory during connection of the accessory. Thereby, the vehicle can be connected to and communicate with any accessory for which there is sufficient information in the remote server, eliminating the need for workshop configuration of a particular vehicle-accessory combination. Accordingly, by means of the above described method for acquiring information, both vehicles and accessories can be utilized more efficiently since there is no downtime for service and reconfiguration when a vehicle is connected to a previously unknown accessory, or to an accessory having new functionality.

According to one embodiment, acquiring an accessory identifier comprises establishing a communication channel between the accessory and the vehicle, transmitting an accessory identifier from the accessory to the vehicle, and receiving the accessory identifier in a control unit of the vehicle. In cases where there is no pre-existing communication channel between the vehicle and the accessory, it is desirable to, if possible, establish such a communication channel for automatically transferring the accessory identifier from the accessory to the vehicle. A pre-existing communication channel may be either or both of a wired and/or a wireless communication channel.

According to one embodiment, the communication channel may advantageously be a wireless communication channel. Thereby, there is no need for a physical connection between the vehicle and the trailer for transmitting the accessory identifier.

According to one embodiment, acquiring an accessory identifier may comprise acquiring information from a label located on the accessory. The accessory identifier may for example be a visible label in the form of a written or printed label on the accessory, requiring that an operator accesses the label and inputs the label information to the vehicle. Thereby, it is not required that the accessory has any communication capabilities, the vehicle can still acquire the accessory identifier and thereby the correct accessory information from the server.

According to one embodiment, the label may be a barcode, a QR-code, a text label, or an RFID-tag. Accordingly, an operator may either read the label manually and input the accessory identifier from the label into a vehicle interface, or the operator may use an electronic reader or a camera in a smartphone or tablet for acquiring the accessory identifier. The label may also be read by a reader installed in the vehicle.

According to one embodiment, the accessory information may comprise a control program for controlling a functionality of the accessory. Thereby, accessory information is not limited to only information about the accessory, the accessory information may also enable the vehicle to interactively control functionality of the accessory. An advantage of acquiring such control functionality from the server is that it can be ensured that the latest software version for controlling the accessory is used, and there is thus no need to store control programs for a range of different accessories in the vehicle. This is advantageous since control programs stored on the vehicle may not be regularly updated, and if an accessory is connected which requires the latest software version, there may be compatibility issues between the vehicle and the accessory.

According to one embodiment, the accessory information received in the vehicle may comprise a communication protocol enabling communication between the vehicle and the accessory. Thereby, in case there is no established communication channel between the vehicle and the accessory, the received information may enable communication.

Accordingly the described method facilitates connection to and use of new accessories without any pre-existing knowledge of the accessory in the vehicle.

According to one embodiment, the accessory information may comprise information describing properties of the accessory. Thereby, the vehicle can fully utilize the accessory based on current information describing the properties of the accessory.

According to one embodiment, the accessory information comprises information of a cargo of the accessory. Accordingly, in cases where the vehicle is connected to an accessory holding a cargo, the vehicle can be informed of the status of the cargo by means of the accessory information. Such cargo information may for example be provided to the remote server during loading of the cargo, even if the vehicle is not present.

According to one embodiment of the invention, matching the accessory identifier with corresponding accessory information in the remote server comprises acquiring accessory information from an accessory supplier server. There may be instances when the requested information is not available on the remote server, which for example may be operated and maintained by a fleet owner. In such instances, the remote server establishes contact with a server maintained by an accessory supplier, vendor and/or manufacturer, either to acquire information describing a previously unknown accessory for which information is not available on the remote server, or to ensure that the most up to date information is acquired.

According to one embodiment of the invention the accessory identifier may describe an accessory type. It may be sufficient for the vehicle to know the accessory type to get the relevant information from the remote server. This is for example the case for an accessory type for which it can be assumed that all accessories of the same type have the same or sufficiently similar properties.

According to one embodiment of the invention, the accessory identifier may uniquely define a specific accessory. Thereby, the vehicle can get information describing properties of a uniquely identified accessory. Such specific knowledge may for example be advantageous in case of an accessory holding a cargo, where the accessory information may then include cargo information and the intended destination of the cargo.

According to one embodiment the accessory may be a bodywork, an equipment, a container or a trailer. Accordingly, the above described embodiments are applicable for many different types of accessories. Furthermore, it should be understood that the accessory is typically not an integral part of the vehicle. Instead, the accessory is often a separate unit which may be replaced or exchanged between vehicles as will be exemplified in the following.

According to one embodiment, the method may further comprise mechanically connecting the accessory to the vehicle and acquiring the accessory identifier from the accessory after forming the mechanical connection. The mechanical connection may for example be required for establishing a wired communication channel between the vehicle and the accessory, wherein the accessory information is provided via the wired communication channel. Requiring a mechanical connection also increases security in embodiments where access to the accessory identifier is prohibited unless the required mechanical connection exists. The accessory may for example comprise a cargo, in which case it is desirable that the accessory identifier is not released by the accessory without the appropriate authorization, where a mechanical connection may be part of such an authorization. However, the communication between the vehicle and the accessory may also be performed prior to forming a mechanical connection such that the vehicle already has received the relevant accessory information when the mechanical connection is formed.

According to one embodiment, the method may further comprise, in the vehicle by the vehicle control unit, receiving updated accessory information from the accessory; and providing the updated accessory information to the remote server. Thereby, the accessory information on the server may be updated via the vehicle. This is advantageous since other vehicles then may receive updated information about the accessory when requesting the accessory information from the remote server.

There is also provided a computer program comprising program code means for performing the steps of any of the above described embodiments when the program is run on a computer.

It is furthermore provided a computer readable medium carrying a computer program comprising program code means for performing the steps of any of the above described embodiments when program code is run on a computer.

According to a second aspect of the invention, the object is achieved by a system for acquiring information according to claim 18.

Accordingly, there is provided a system for acquiring information of an accessory connected to a vehicle. The system comprises a vehicle control unit arranged in the vehicle. The vehicle control unit is configured to acquire an accessory identifier from the accessory. The vehicle control unit is further configured to transmit the accessory identifier to a remote server comprising accessory information, the remote server being configured to match the accessory identifier with corresponding accessory information and to transmit the accessory information to the vehicle control unit.

According to one embodiment, the system may further comprise acquisition means for acquiring the accessory identifier from the accessory. The acquisition means may for example comprise an input terminal, an optical reader, an NFC reader and/or a wireless communication device. Thereby, the accessory identifier may be acquired by the vehicle in many different ways, with or without the involvement of an operator.

According to one embodiment, the system may comprise a wireless communication device configured to establish a wireless communication channel with the accessory control unit. Thereby, the accessory identifier can be automatically transmitted from the accessory to the vehicle once the communication channel is established.

There is also provided a vehicle comprising a system according to any one of the aforementioned embodiments. A vehicle comprising the described system may be connected to an accessory such as a trailer, tail lift, concrete mixer, hook lift, refrigerator body, side/skip loader, snow plough, tipper, walking floor, bulk tank, timber body, heavy haulage gooseneck, van body, curtain body, swap body or a dump body.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

In the present detailed description, various embodiments of the system and method of acquiring information of an accessory being connected to a vehicle according to the present invention are mainly described with reference to a truck being connected to a 30 truck body. However, it should be noted that various embodiments of the described invention are equally applicable for a wide range of vehicles and accessories.

Figure 1:
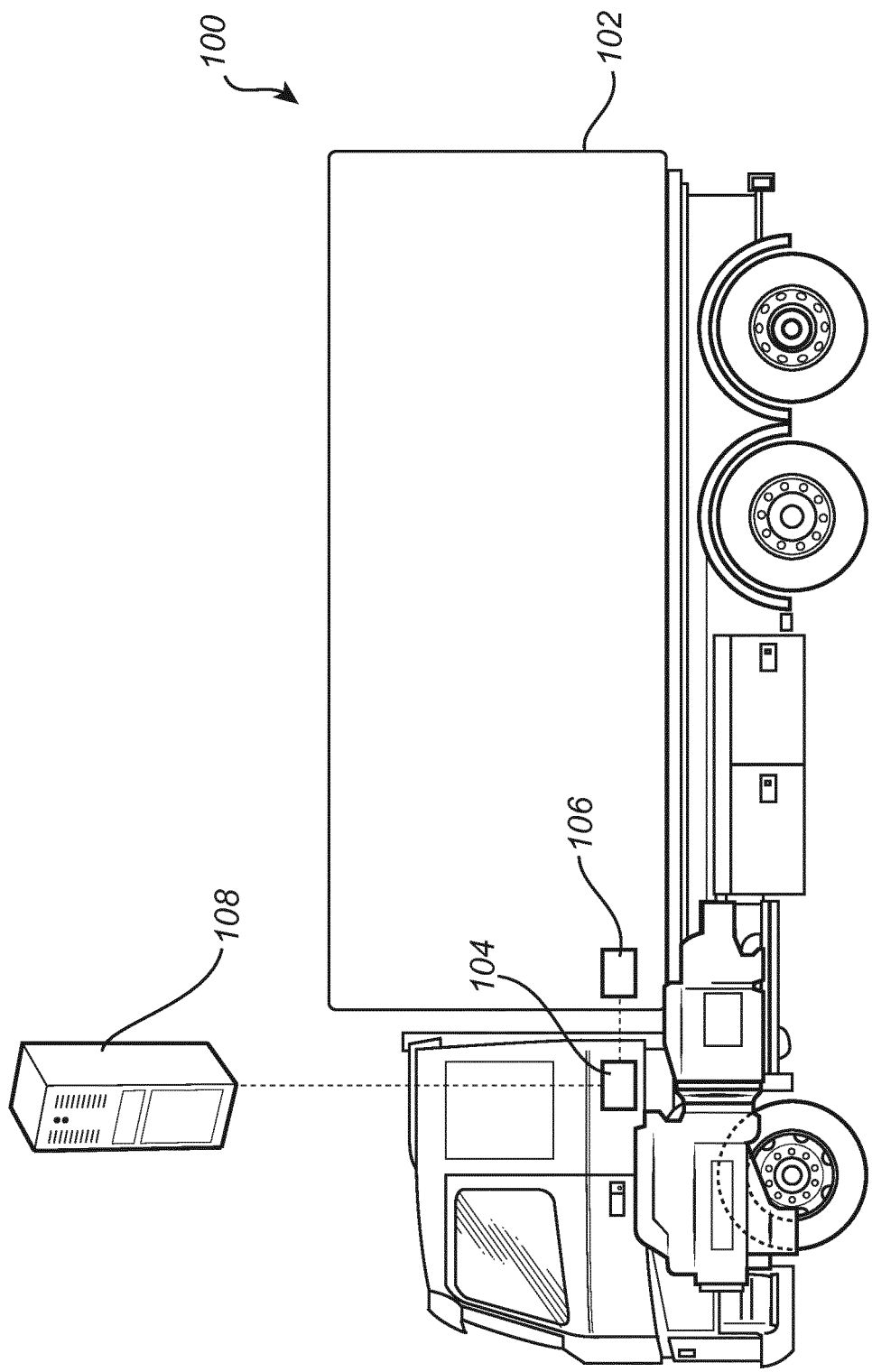
FIG. 1 is a vehicle comprising a system according to an embodiment of the invention.
Figure 2:
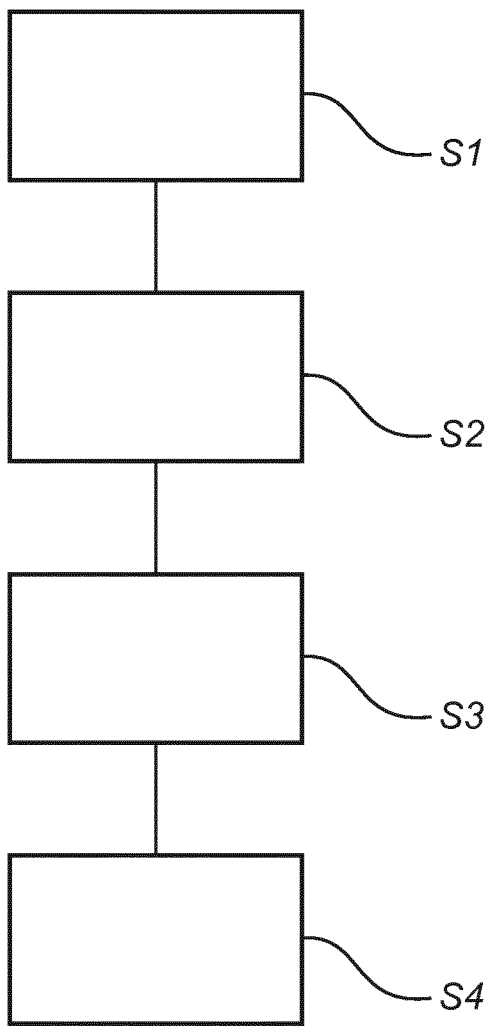
FIG. 2 is a flow chart outlining the steps of a method according to an embodiment of the invention.

FIG. 1 schematically illustrates a vehicle 100 having an accessory 102 in the form of a body 102 connected to the vehicle 100. Embodiments of the invention will in the following detailed description be described with further reference to the flow chart of FIG. 2 outlining the general method steps of an embodiment of the invention.

In a first step S1, a vehicle control unit 104 is configured to acquire S1 an accessory identifier from the vehicle 100. The accessory identifier is then transmitted S2 to a remote server 108 where it is matched S3 with corresponding accessory information. The step of matching S3 may be performed by comparing the received accessory identifier with a list of accessory identifiers stored in a database on the server 108 and retrieving the associated accessory information from the database once a match has been found. It should be noted that the matching in the remote server may be performed in any suitable manner. The retrieved accessory information is subsequently transmitted S4 to the vehicle 100 where it is received S5 by the control unit 104. When the control unit 104 has received the accessory information, the accessory information can be used by the vehicle to for example communicate with and control the accessory 102. The accessory information may be a control program for controlling a functionality of the accessory 102 or a communication protocol enabling communication between the vehicle 100 and the accessory 102.

The control unit 104 may include a microprocessor, microcontroller, programmable digital signal processor or another programmable device. Thus, the control unit comprises electronic circuits and connections (not shown) as well as processing circuitry (not shown). Moreover, the control unit may comprise modules in either hardware or software, or partially in hardware or software and communicate using known transmission buses such as CAN-bus and/or wireless communication capabilities. The processing circuitry may be a general purpose processor or a specific processor. The control unit further comprises a non-transitory memory for storing computer program code and data upon. Thus, the skilled addressee realizes that the control unit may be embodied by many different constructions. Moreover, the control unit may be a dedicated control unit adapted to communicate with an accessory and with the remote server, or the control unit may be a general purpose control unit of the vehicle comprising additional functionality.

The remote server 108 may be part of or connected to a larger telematics system, or it may be a stand-alone server operated by a fleet manager, a service and maintenance operation, a vehicle manufacturer, or an accessory manufacturer. Furthermore, the remote server 108 may be accessed via any communication device and method available in the vehicle, such as WiFi, Bluetooth, GSM, or other known data communication methods.

Figure 3:
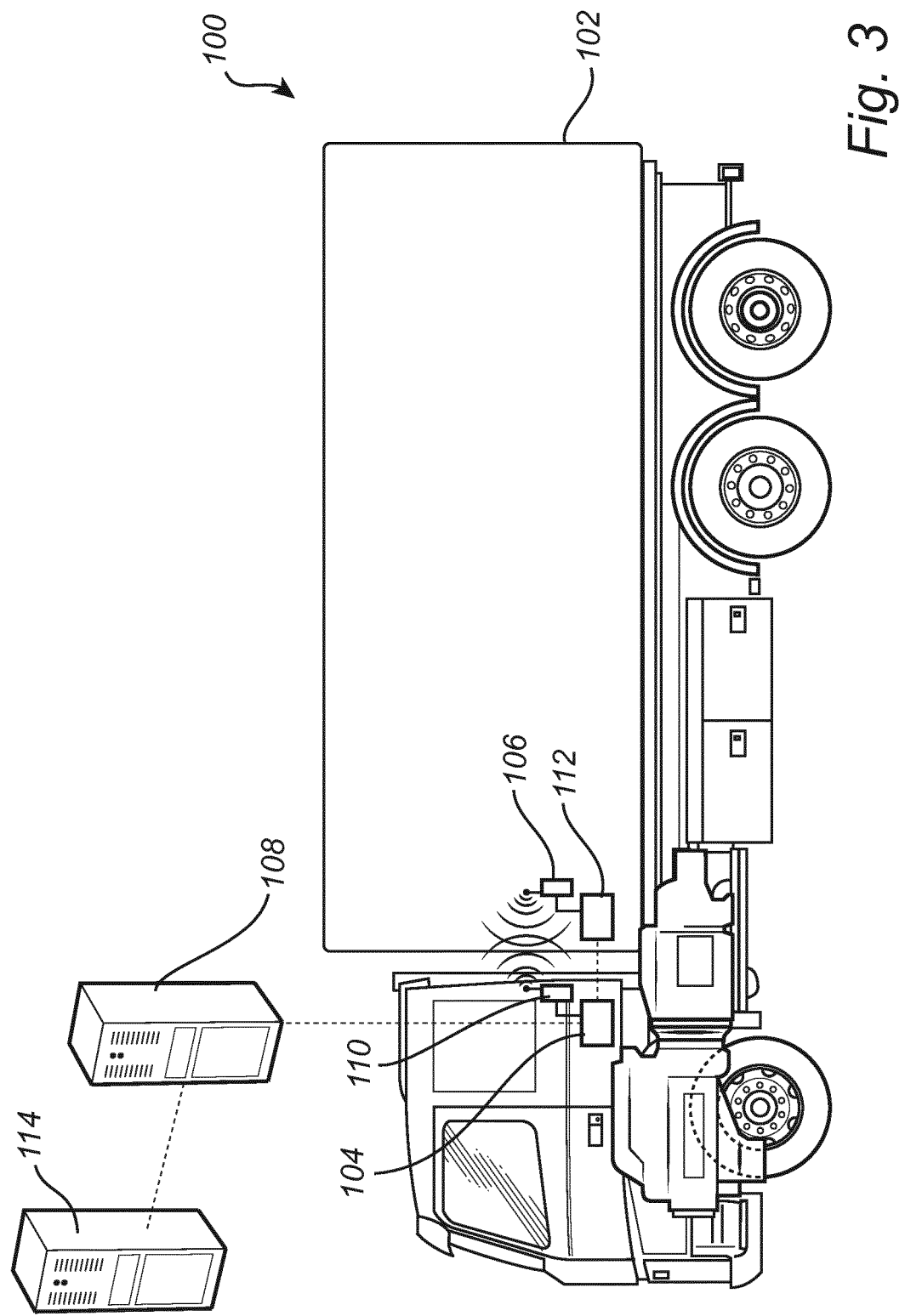
FIG. 3 is a vehicle comprising a system according to an embodiment of the invention.
Figure 4:
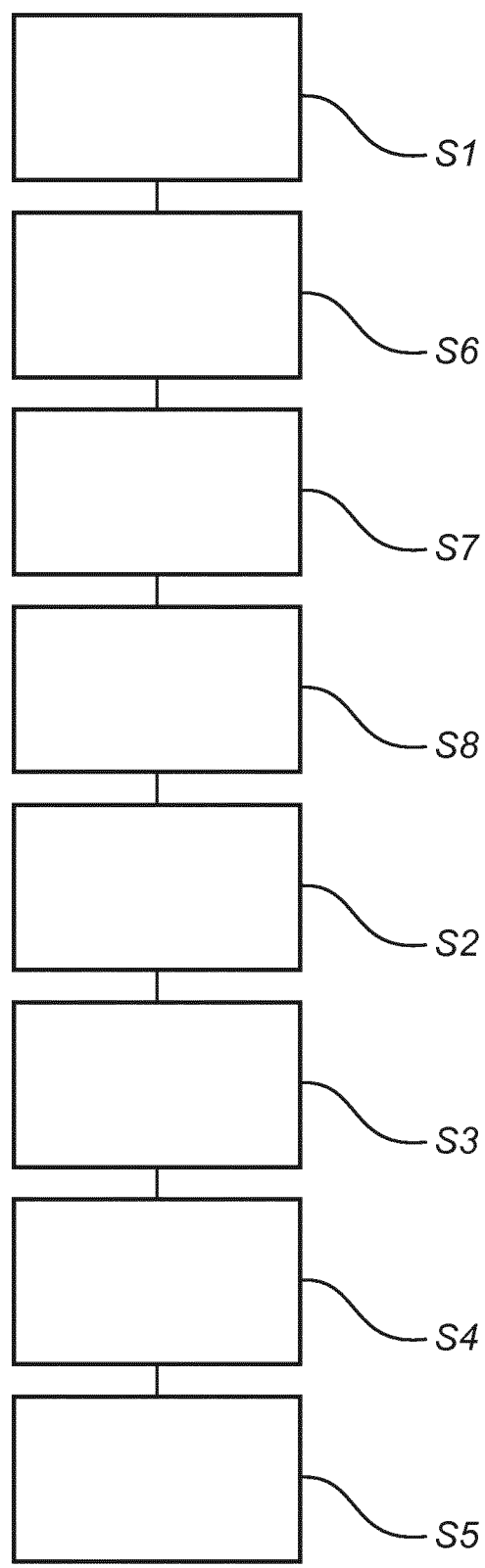
FIG. 4 is a flow chart outlining the steps of a method according to an embodiment of the invention.

In an example embodiment of the invention, the communication channel between the vehicle 100 and the accessory may be a wireless communication channel as illustrated in FIG. 3 with further reference to the flow chart of FIG. 4 outlining the steps of acquiring S1 the accessory identifier. The illustrated method comprises establishing (S6) a wireless communication channel using a wireless communication device 110 of the vehicle 100 and a wireless communication device 106 of the accessory 102. The wireless communication device 106 of the accessory 102 may further comprise or be connected to an accessory control unit 112. The wireless interface may for example be a WiFi or BLE (Bluetooth low energy) connection. When the wireless communication channel is established, the method further comprises transmitting S7 an accessory identifier from the accessory 102 to the vehicle 10 and receiving S8 the accessory identifier in the control unit 104 of the vehicle. Once the accessory identifier is received by the control unit 104, the method is followed by the steps S2-S5 described above with reference to FIG. 2

The above described method and system may advantageously be used in any kind of bodies that are capable of being controlled to carry out specific functionalities. Some examples of bodywork are concrete mixer, hook lift, refrigerator body, side/skip loader, snow plough, tipper, tail lift, bulk tank, dump body etc. A truck can be assumed to have an built-in control device in the cabin for the driver to control the mounted bodywork and monitor the status of the bodywork. Embodiments of the invention thereby allows the remote server to deliver the configuration of the bodywork to the truck such that the same software built-in the in-vehicle control device is able to control and monitor multiple kinds of bodyworks.

FIG. 4 further illustrates that matching the accessory identifier with corresponding accessory information in the remote server 108 may comprise acquiring accessory information from a second server 114 such as an accessory supplier server 114. Accordingly, the remote server 108 may in turn search for, request and retrieve information form a third party, such as the supplier of a particular accessory, to ensure that the vehicle receive the required accessory information.

The above described method and system may also be used in a truck for goods transport which normally is mounted with one or more trailers. The trailers may in turn comprise built-in weight sensors and other sensors for controlling the cargo. For each trailer with built-in weighing sensors, their weight data can be transferred to the truck through the established data connection. This invention allows the remote server 108 to deliver the configuration of the vehicle combination, i.e., the number of mounted trailers, types of trailers, data format of the weight sensors, to the truck such that the in-vehicle software is able to interpret the messages from the different truck-trailer(s) combinations.

Moreover, any data provided to the remote server 108 from the vehicle 100, for example relating the cargo status and weight, may in turn be provided to a fleet management or transport logistics system for keeping track of the status of the truck, trailer and cargo. The vehicle may also communicate with a plurality of accessories connected to the vehicle.

It is to be understood that the present invention is not limited to the embodiments described above and illustrated in the drawings; rather, the skilled person will recognize that many changes and modifications may be made within the scope of the appended claims.

The invention claimed is:

1. A method of acquiring information of an accessory connected to a vehicle, the method comprising:
   in a control unit of the vehicle, acquiring an accessory identifier from the accessory, the accessory comprising a trailer configured to hold cargo;
   transmitting the accessory identifier to a remote server comprising accessory information;
   receiving, from the remote server, accessory information in the control unit of the vehicle, the accessory information corresponding to the accessory identifier, wherein the accessory information comprises a control program for controlling a functionality of the accessory; and
   transferring weight information about the accessory to the vehicle.

2. The method of claim 1, wherein acquiring an accessory identifier comprises:
   establishing a communication channel between the accessory and the vehicle; and
   receiving the accessory identifier in the control unit of the vehicle.

3. The method of claim 2, wherein the communication channel is a wireless communication channel.

4. The method of claim 1, wherein acquiring an accessory identifier comprises acquiring information from a label located on the accessory.

5. The method of claim 4, wherein the label is a bar-code, a QR-code, a text label, or an RFID-tag.

6. The method of claim 1, wherein the accessory information comprises a communication protocol enabling communication between the vehicle and the accessory.

7. The method of claim 1, wherein the accessory information comprises information describing properties of the accessory.

8. The method of claim 1, wherein the accessory information comprises information of a cargo of the accessory.

9. The method of claim 1, further comprising acquiring, by the remote server, accessory information from an accessory supplier server to match the accessory identifier with corresponding accessory information.

10. The method of claim 1, wherein the accessory identifier describes an accessory type.

11. The method of claim 1, wherein the accessory identifier uniquely defines a specific accessory.

12. The method of claim 1, wherein the accessory is a bodywork, an equipment, a container or a trailer.

13. The method of claim 1, further comprising mechanically connecting the accessory to the vehicle and, acquiring the accessory identifier from the accessory after forming the mechanical connection.

14. The method of claim 1, further comprising:
   in the vehicle control unit, receiving updated accessory information from the accessory; and
   providing the updated accessory information to the remote server.

15. A system for acquiring information of an accessory connected to a vehicle, the system comprising:
   a vehicle control unit arranged in the vehicle, the vehicle control unit being configured to:
      acquire an accessory identifier from the accessory, the accessory comprising a trailer configured to hold cargo;
      transmit the accessory identifier to a remote server comprising accessory information;
      receive, from the remote server, the accessory information to the vehicle control unit, the accessory information corresponding to the accessory identifier, wherein the accessory information comprises a control program for controlling a functionality of the accessory: and
      transfer weight information about the accessory to the vehicle.

16. The system of claim 15, further comprising an acquisition device for acquiring the accessory identifier from the accessory.

17. The system of claim 16, wherein the acquisition device comprises an input terminal, an optical reader, an NFC reader and/or a wireless communication device.

18. The system of claim 17, comprising a wireless communication device in the vehicle configured to establish a wireless communication channel with wireless communication device in the accessory.

19. A system for acquiring information of an accessory connected to a vehicle, the system comprising:
   a vehicle control unit arranged in the vehicle, the vehicle control unit being configured to:
      acquire an accessory identifier from the accessory, the accessory comprising a bodywork configured to hold cargo;
   transmit the accessory identifier to a remote server comprising accessory information; and
      receive, from the remote server, the accessory information to the vehicle control unit, the accessory information corresponding to the accessory identifier, wherein the accessory information comprises a control program for controlling a functionality of the accessory: and
   a built-in control device in a cabin of the vehicle configured to provide driver control of the bodywork.

20. The system of claim 19, wherein the accessory comprises a tail lift, concrete mixer, hook lift, refrigerator body, side/skip loader, snow plow, tipper, walking floor, bulk tank, timber body, heavy haulage gooseneck, van body, curtain body, swap body or a dump body.

* * * * *